United States Patent [19]

Sugino et al.

[11] Patent Number: 4,505,636

[45] Date of Patent: Mar. 19, 1985

[54] ROBOT MACHINES

[75] Inventors: Yoshihide Sugino, Chigasaki; Takashi Tsumura, Atsugi; Junnosuke Nakamura, Yokohama; Kazuyoshi Yamaki, Chigasaki, all of Japan

[73] Assignee: Yamatake Honeywell Co., Ltd., Japan

[21] Appl. No.: 547,462

[22] Filed: Nov. 1, 1983

Related U.S. Application Data

[63] Continuation of Ser. No. 292,303, Aug. 12, 1981, abandoned.

[30] Foreign Application Priority Data

Aug. 15, 1980 [JP] Japan ................................. 55-11754

[51] Int. Cl.³ .............................................. B25J 13/00
[52] U.S. Cl. ..................................... 414/736; 414/732; 901/37; 901/39
[58] Field of Search ............... 414/222, 225, 736, 741, 414/732, 590, 751, 753, 730; 29/568; 294/87 R, 87 SH, 87.22, 87.24, 87.26; 82/2.5; 901/31, 36, 37, 39

[56] References Cited

U.S. PATENT DOCUMENTS

| 2,811,267 | 10/1957 | Bock | 414/736 X |
| 3,028,020 | 4/1962 | Péras | 414/736 X |
| 3,760,958 | 9/1973 | Lohneis | 414/736 |
| 4,017,114 | 4/1977 | La Bounty | 414/732 X |
| 4,082,018 | 4/1978 | Russell et al. | 82/2.5 |
| 4,151,918 | 5/1979 | Nakane | 29/568 X |
| 4,288,192 | 9/1981 | Geiger et al. | 414/225 X |
| 4,302,144 | 11/1981 | Hallqvist | 414/590 |

FOREIGN PATENT DOCUMENTS 53-34268  3/1978  Japan ................................. 414/732

*Primary Examiner*—Leslie J. Paperner
*Assistant Examiner*—Terrance L. Siemens
*Attorney, Agent, or Firm*—Remy J. VanOphem

[57] ABSTRACT

In a robot machine, a hand is rotatably mounted on one end of an arm. The hand is provided with two sets of grasping units each including a pair of opposed fingers which are used to grasp or release an article, for example, a workpiece to be machined by a machine tool. A piston-cylinder assembly is provided for rotating the hand through a ninety degree angle.

11 Claims, 6 Drawing Figures

ROBOT MACHINES

This is a continuation of application Ser. No. 292,303 filed Aug. 12, 1981, now abandoned.

BACKGROUND OF THE INVENTION

This invention relates to robot machines and in particular to robot hands of a robot machine.

A robot hand has been proposed in which two sets of workpiece grasping units are provided for the fore end of an arm for the purpose of decreasing the number of opeations of the hands for loading or unloading the workpiece on or from a machine tool capable of machining continuously with the robot hand. More particularly, while one grasping unit of the robot hand utilized to unload a workpiece secured to the machine tool by a chuck, for example, is made to be idle, the other grasping unit is actuated to grasp another workpiece to be subsequently loaded. As the robot hand approaches a chuck, the idle grasping unit is aligned with the workpiece and, then, the fingers of that grasping unit are operated to grasp the workpiece. When the chuck releases the workpiece, the other grasping unit is coaxial with the chuck and, then, the jaws of the chuck are closed to securely load the new workpiece on the machine tool. Then, the workpiece removed from the machine tool is grasped by the idle grasping unit. The hand, which has finished supplying the new workpiece, is returned to a predetermined position. Thus, when compared with a robot machine having only one hand, it is possible to save one conveyance operation corresponding to one reciprocating motion, during each operation described above.

However, during the above-described operations, when the center of the chuck is shifted from alignment with the center of one grasping unit to alignment with the center of the other grasping unit, the realignment has occurred through motion of the arm. In such a case, depending on the relative position of the grasping units, it is necessary to move the hand in the vertical direction or to reverse the motion of the entire hand.

In this case, since the weight of the arm acts as a load on a member to be manipulated some operating power is lost and quick operation is impaired. Moreover, vibrations are liable to be induced, making it difficult to accurately align centers.

SUMMARY OF THE INVENTION

Accordingly, it is an object of the present invention to provide an improved robot machine capable of eliminating the disadvantages described above.

Another object of the present invention is to provide a robot machine capable of reducing by one half, the number of operations required for accurately positioning the robot hand.

According to the present invention, there is provided a robot machine having a hand rotatably mounted on one end of an arm and two sets of grasping units equally spaced from a center of rotation of the hand. Each grasping unit includes a pair of opposed fingers and means for causing the fingers to move towards and away from a grasping center for grasping or releasing an article. Means are provided for rotating the hand through an angle subtended by the grasping centers of the pair of opposed fingers relatives to the center of rotation of the hand.

DESCRIPTION OF THE PREFERRED EMBODIMENT

Figure 1:
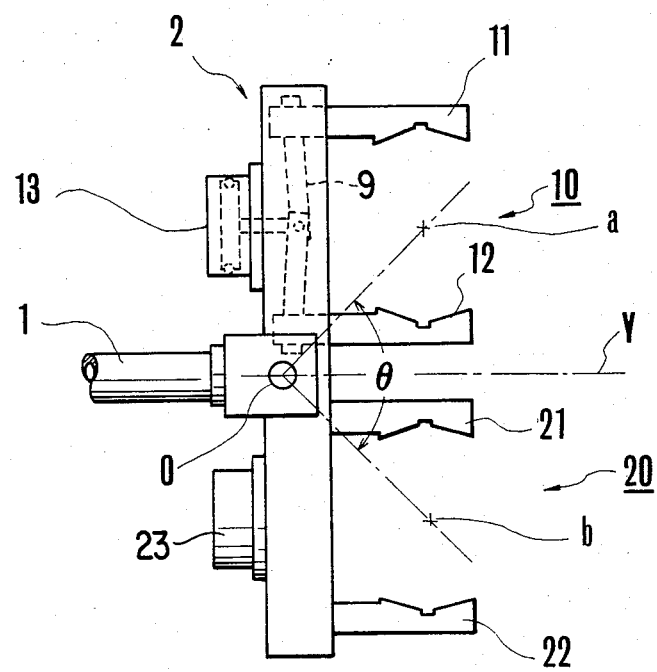
FIG. 1 is a side view showing an arm of a robot machine and a pair of grasping units according to the present invention.

The robot machine shown in FIG. 1 including an arm 1 which is movable according to an instruction and a hand 2 mounted on the free end of the arm to be rotatable about an axis of rotation or pivot axis 0. The hand 2 is provided with a first grasping unit 10 having fingers 11 and 12 and a second grasping unit 20 having fingers 21 and 22. As shown by dotted lines, each grasping unit 10 and 20 is driven by a drive source, for example, air cylinders 13 and 23, respectively, through a suitable link mechanism 9 to swing towards and away from respective grasping center points a and b which are equally spaced from the axis of rotation 0 and symmetrical with respect to a reference line Y, which is the longitudinal axis of the arm 1.

Figure 2:
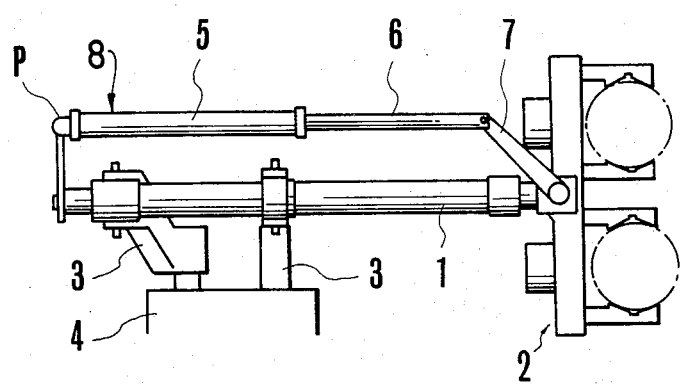
FIG. 2 is a side view showing the entire robot machine.

The hand 2 and the grasping units 10 and 20 shown in FIG. 1 constitute a portion of the robot machine 8, as shown in FIG. 2. Thus, the arm 1 is mounted on a base 4 through supports 3. A piston cylinder assembly 5 having a piston rod 6 is provided. The cylinder is connected to the rear end of the arm 1 to be swingable about a pivot point P. The front end of the piston rod 6 is connected to the fore end of the arm 1 through a link 7 so as to permit selective rotation of the hand 2. The reciprocating motion of the piston rod 6 rotates the robot hand 6 about the pivot axis 0 by an angle Θ (FIG. 1) subtended by the grasping center points a and b so as to position the grasping center of the second grasping unit 20 at point a or to position the grasping center of the first grasping unit 10 at point b.

Figure 3A:
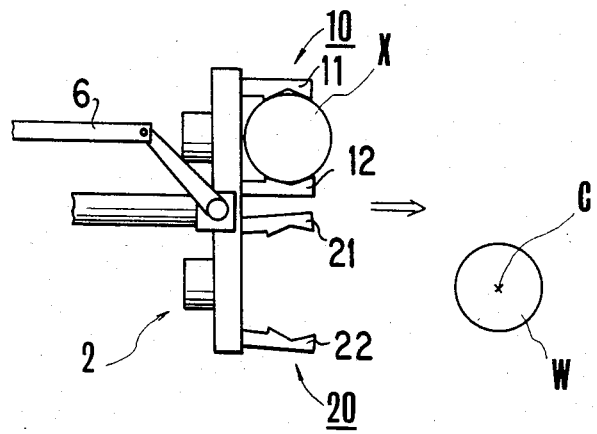
FIGS. 3A through 3D are partial side views showing the manner of grasping and releasing workpieces using the grasping units of the present invention.
Figure 3B:
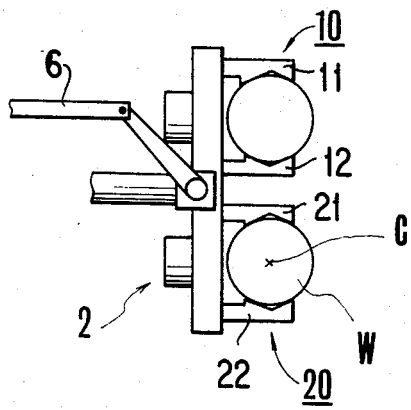

Referring now to FIGS. 3A and 3B, the operation for loading a workpiece on a horizontal type machine tool, for example, a lathe (not shown) will be described. In FIG. 3A, W represents a workpiece already loaded on the lathe and X represents another workpiece to be substituted for the workpiece W. FIG. 3A shows a condition in which the hand 2 is advanced to bring the grasping center b of the second grasping unit 20 into axial alignment with a rotary axis C of the chuck (not shown) of the lathe. FIG. 3B shows a condition in which the fingers 21 and 22 of the second grasping unit 20 have just grasped the workpiece W. At this time, the jaws (not shown) of the chuch may release the workpiece W.

Figure 3C:
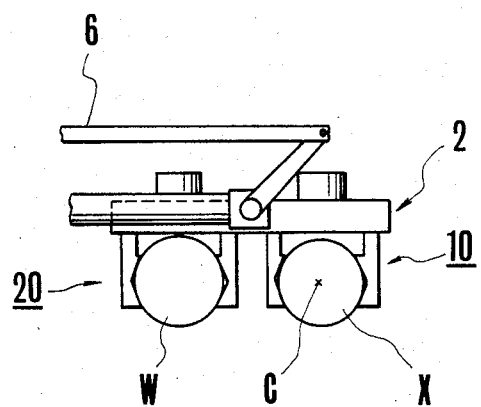

The hand 2 is constructed, in any appropriate manner, such that when its movement is obstructed by the jaws of the chuck, it is moved slightly in a direction perpendicular to the sheet of drawing. FIG. 3C shows a condition in which the hand 2 has been rotated 90° from the position shown in FIGS. 3A and 3B by the motion of the piston rod 6. At this time, the workpiece W grapsed by the second grasping unit 20 has been released from the chuck, whereas the new workpiece X grasped by the first grasping unit 10 is brought into axial alignment with the center of the chuck. When the hand 2 is restored to its original axial position, the fingers of the chuck are closed to secure the workpiece X to the lathe.

Figure 3D:
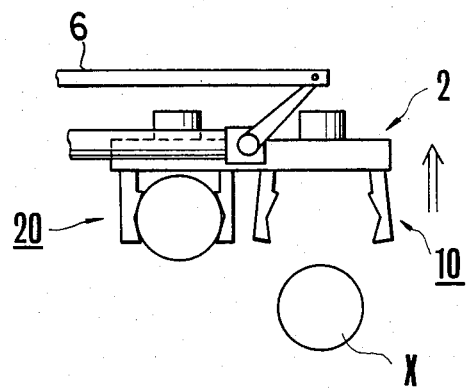

FIG. 3D shows a condition in which the fingers of the first grasping unit 10 are opened and the hand 2 has risen to release the workpiece.

During a series of operations such as that described above, the accurate positioning of the the first and second grasping units 10 and 20, respectively, by means of the arm 1 is required only when the second grasping unit 20 must be accurately positioned relative to the workpiece W, as shown in FIG. 3B. The succeeding positioning of the first grasping unit can be accomplished by merely rotating the hand 2 since the first grasping unit 10 moves into the previous position of the second grasping unit 20 without any need for operating the arm 1.

As described above, according to the present invention, the number of positionings of the robot hand which must be accurate is decreased to one half of the number required by prior art robot hands. Therefore, it is possible to eliminate all such difficulties as loss of power, sluggish movement and vibration which are caused by the weight of the hand. Moreover, the rotary movement of the hand 2 is restricted to a space in which the hand 2 is moved by the arm 1 so that no additional space is required, which is advantageous for machine tools or the like.

The above description is by way of example and not by way of limitation. Various modifications will be apparent to those skilled in the art upon reviewing the present application and are intended to be included within the scope of the appended claims.

What is claimed as novel is as follows:

1. A robot machine for grasping and releasing an article, said robot machine comprising:
   an arm;
   a hand rotatably mounted to said arm such as to rotate about a predetermined axis around a center of rotation;
   two sets of grasping units equally spaced from said predetermined axis, each set of said two sets of said grasping units comprising a pair of opposed fingers, said pair of opposed fingers having a predetermined grasping center;
   means for causing said pair of opposed fingers to move towards and away from said predetermined grasping center, said means for causing said pair of opposed fingers to move towards and away from said predetermined grasping center moving in a plane generally perpendicular to said predetermined axis;
   each finger of said pair of opposed fingers comprising an elongated member extending from said hand, each finger further being substantially parallel to the other of said pair of opposed fingers; and
   means for rotating said hand about said predetermined axis.

2. The robot machine of claim 1 wherein said means for rotating said hand comprises a piston-cylinder assembly pivotably connected to said arm and a link cooperating with said piston-cylinder assembly for rotating said hand about said predetermined axis.

3. The robot machine of claim 1 wherein an angle around said center of rotation included between each said predetermined grasping center of each said pair of opposed fingers is substantially less than one hundred and eighty degrees.

4. The robot machine of claim 1 wherein said means for causing each pair of opposed fingers to move towards and away from said predetermined grasping center comprises a reciprocable drive source, and two elongated link members each having two ends, one of said ends being pivotally fastened to said reciprocable drive source and the other of said ends being pivotally fastened to one of said fingers.

5. A robot machine for grasping and releasing an article, said robot machine comprising:
   a robot arm;
   a robot hand pivotally fastened to said robot arm such as to pivot about a predetermined axis around a center of rotation;
   a first pair of opposed fingers movably mounted to said robot hand;
   a first fixed grasping center spaced between said first pair of opposed fingers at a first predetermined distance from said predetermined axis;
   a first selectively operable finger movement means for simultaneously moving said first pair of opposed fingers towards said first fixed grasping center for grasping said article and for simultaneously moving said first pair of opposed fingers away from said first fixed grasping center for releasing said article;
   a second pair of opposed fingers movably mounted to said robot hand;
   a second fixed grasping center spaced between said second pair of opposed fingers at a second predetermined distance from said predetermined axis;
   second selectively operable finger movement means independent of said first selectively operable finger movement means for simultaneously moving said second pair of opposed fingers towards and away from said second fixed grasping center, said first and second selectively operable finger movement means moving said first and second pairs of opposed fingers towards and away from said first and second fixed grasping centers respectively moving in a plane generally perpendicular to said predetermined axis;
   each finger of said first and second pair of opposed fingers comprising an elongated member extending from said robot hand, each finger further being substantially parallel to each other of said first and second pair of opposed fingers; and
   selectively operable drive means for rotating said robot hand about said predetermined axis.

6. The robot machine of claim 5 wherein said selectively operable drive means for rotating said robot hand comprises reciprocal drive means pivotally connected to the end of said robot arm opposite said robot hand, and a link interposed said reciprocal drive means and said hand for selectively pivoting said hand in response to reciprocation of said reciprocal drive means.

7. The robot machine of claim 5 wherein an angle formed by said first fixed grasping center, said center of rotation and said second fixed grasping center is substantially less than one hundred and eighty degrees and wherein said first predetermined distance between said first fixed grasping center and said predetermined axis is equal to said second predetermined distance between said second fixed grasping center and said predetermined axis.

8. The robot machine of claim 5 wherein at least one of said selectively operable finger movement means comprises a reciprocal drive source and two elongated link members each having two ends, one of said ends being pivotally fastened to said reciprocal drive source and the other of said ends being pivotally fastened to one of said fingers.

9. A robot machine for grasping and releasing an article, said robot machine comprising:
   a robot arm;
   a robot hand pivotally fastened to said robot arm such as to pivot about a predetermined axis around a center of rotation;
   first and second selectively operable reciprocation means mounted to said robot arm on opposite sides of said predetermined axis;
   a first pair of opposed fingers movably mounted to said robot hand and a second pair of opposed fingers movably mounted to said robot hand, said first pair of opposed fingers having a first predetermined grasping center located at a first predetermined linear distance from said predetermined axis, said second pair of opposed fingers having a second predetermined grasping center located at a second predetermined linear distance from said predetermined axis;
   first and second linkage means interposed said first and second selectively operable reciprocation means and said first pair and said second pair of opposed fingers, respectively, each of said first and second lingkage means being selectively operable to move said first pair of opposed fingers towards and away from said first predetermined grasping center so as to grasp and release said article and to move said second pair of opposed fingers towards and away from said second predetermined grasping center so as to grasp and release said article, said movement of said first and second pairs of opposed fingers by said first and second linkage means occurring in a plane generally perpendicular to said predetermined axis;
   each finger of said first and second pair of opposed fingers comprising an elongated member extending from said robot hand, each finger further beind substantially parallel to each other of said first and second pair of opposed fingers;
   third selectively operable reciprocation means mounted parallel to said robot arm; and
   a link interposed said third selectively operable reciprocation means and said robot hand for rotating said robot hand about said predetermined axis in response to reciprocation of said third selectively operable reciprocation means.

10. A robot machine for grasping and releasing an article, said robot machine comprising:
    a robot arm;
    a robot hand pivotally fastened to said robot arm such as to pivot about a predetermined axis around a center of rotation;
    a first pair of opposed fingers movably mounted to said robot hand and a second pair of opposed fingers movably mounted to said robot hand, said first pair of opposed fingers having a first predetermined grasping center located at a first predetermined linear distance from said predetermined axis, said second pair of opposed fingers having a second predetermined grasping center located at a second predetermined linear distance from said predetermined axis, said first predetermined linear distance being equal to said second predetermined linear distance;
    each finger of said first and second pair of opposed fingers comprising an elongated member extending from said robot hand, each finger further being substantially parallel to each other of said first and second pair of opposed fingers;
    a predetermined angular distance about said center of rotation between said first predetermined grasping center and said second predetermined grasping center, said predetermined angular distance being theoretically less than one hundred and eighty degrees;
    selectively operable reciprocation means mounted parallel to said robot arm, said selectively operable reciprocation means being selectively operable to rotate said robot hand through said predetermined angular distance; and
    a link interposed said selectively operable reciprocation means and said robot hand for rotating said robot hand about said predetermined axis in response to reciprocation of said selectively operable reciprocation means.

11. The robot machine of claim 10 wherein said predetermined angular distance is approximately ninety degrees.

* * * * *

UNITED STATES PATENT AND TRADEMARK OFFICE
CERTIFICATE OF CORRECTION

PATENT NO. : 4,505,636
DATED : March 19, 1985
INVENTOR(S) : Yoshihide Sugino, et al.

It is certified that error appears in the above-identified patent and that said Letters Patent is hereby corrected as shown below:

Column 1, line 67, delete "relatives" and insert ---- relative ----.

Column 2, line 15, delete "including" and insert ---- includes ----.

Column 2, line 39, delete the numeral "6" and insert the numeral ---- 2 ----.

Column 3, line 4, after "fingers" insert ---- 11 and 12 ----.

Column 5, line 37, delete "occurring" and insert ---- moving ----.

Column 5, line 41, delete "beind" and insert ---being---.

Signed and Sealed this

Twenty-third Day of July 1985

[SEAL]

Attest:

DONALD J. QUIGG

Attesting Officer   Acting Commissioner of Patents and Trademarks